United States Patent [19]

Horie

[11] Patent Number: 4,885,736

[45] Date of Patent: Dec. 5, 1989

[54] OPTICAL RECORDING MEDIUM WITH TRACK AND TRACK NUMBER GUIDES

[75] Inventor: Kiyoshi Horie, Tokyo, Japan

[73] Assignee: CSK Corporation, Tokyo, Japan

[21] Appl. No.: 88,727

[22] Filed: Aug. 21, 1987

[30] Foreign Application Priority Data

Aug. 22, 1986 [JP] Japan .................. 61-196796

[51] Int. Cl.⁴ .................. G06K 19/06; G11B 7/007
[52] U.S. Cl. .................. 369/275; 369/277; 369/279; 235/487; 235/494
[58] Field of Search .................. 369/275, 46, 52, 32, 369/272, 277, 279, 111, 97; 235/487, 488, 454, 456, 494; 365/234; 358/342

[56] References Cited

U.S. PATENT DOCUMENTS

| | | | |
|---|---|---|---|
| 3,351,948 | 11/1967 | Bonn | 346/76 L |
| 3,790,755 | 3/1974 | Silverman | 235/449 |
| 3,919,697 | 11/1975 | Walker | 358/342 |
| 4,107,746 | 8/1978 | Conway | 358/342 |
| 4,121,249 | 10/1978 | Lemelson | 360/2 |
| 4,145,758 | 3/1979 | Drexler et al. | 369/44 |
| 4,269,917 | 5/1981 | Drexler et al. | 430/414 |
| 4,278,756 | 7/1981 | Bouldin et al. | 430/414 |
| 4,278,758 | 7/1981 | Drexler et al. | 430/616 |
| 4,360,728 | 11/1982 | Drexler | 346/76 L |
| 4,417,330 | 11/1983 | Hazel et al. | 369/275 |
| 4,500,777 | 2/1985 | Drexler | 235/487 |
| 4,535,439 | 8/1985 | Satoh et al. | 369/275 |
| 4,542,288 | 9/1985 | Drexler | 235/487 |
| 4,544,835 | 10/1985 | Drexler | 235/487 |
| 4,598,393 | 7/1986 | Pierce et al. | 369/46 |

FOREIGN PATENT DOCUMENTS

| | | | |
|---|---|---|---|
| 59-193556 | 11/1984 | Japan | 369/275 |
| 61-243970 | 10/1986 | Japan | 369/275 |
| 61-243973 | 10/1986 | Japan | 369/275 |
| 62-43844 | 2/1987 | Japan | 369/275 |
| 2174530 | 11/1986 | United Kingdom | 235/454 |
| WO84/03986 | 10/1984 | World Int. Prop. O. | 369/275 |

OTHER PUBLICATIONS

Japan Abstract, vol. 9, No. 76 (P-346)(1799), 5/5/85.
Japan Abstract, vol. 8, No. 223 (P-307)(1660), 10/12/84.
Japan Abstract, vol. 10, No. 86 (P-443)(2143), 4/4/86.

Primary Examiner—Alan Faber
Assistant Examiner—Robert A. Weinhardt
Attorney, Agent, or Firm—Lowe, Price, LeBlanc, Becker & Shur

[57] ABSTRACT

An optical recording medium having a plurality of tracks juxtaposed each other and capable of easily and rapidly detecting a desired track. An optical recording medium includes a data recording region in which the tracks are juxtaposed each other and a track detecting region provided at a part of the data recording region. The track detecting region includes track guides juxtaposed along respective tracks and track number guides corresponding to a locus of the movement of an optical head in the access to a desired track, the track number guides intersecting the track guides.

8 Claims, 4 Drawing Sheets

OPTICAL RECORDING MEDIUM WITH TRACK AND TRACK NUMBER GUIDES

FIELD OF THE INVENTION

This invention relates to an optical recording medium having a plurality of tracks juxtaposed each other and capable of easily and rapidly seeking a desired track.

RELATED ARTS

Recently, an optical recording medium has come into the limelight as a substitution for a magnetic card. Since this optical recording medium has by far increased recording capacity as compared with the magnetic card when it is formed in a similar shape and size to those of the magnetic card, various applications have been proposed for the optical recording medium. This large recording capacity of the optical recording medium, however, causes it to take a considerable time to access a desired information.

Heretofore, to seek or detect a desired track for reading data stored therein in a conventional optical recording medium, an optical head is moved in the direction of the track width by a step motor etc. to read track numbers written in predetermined regions of the respective tracks and the read track numbers are each compared with the desired track number. This comparison must be repeated until the optical head has reached the desired track.

This conventional method has such a disadvantage that the track number must be read for every track and compared with the desired track number one by one. The optical head must therefore be moved one by one. By this reason, it takes a considerable time to seek the desired track. Furthermore, since the access operation is carried out sequentially, a track near a reference position can be accessed in a relatively short time, while it takes a considerably long time to access a track remote from the reference position. Thus, the conventional method is not suitable for a random access.

SUMMARY OF THE INVENTION

The present invention has therefore been made to overcome the problems as described above and it is an object of the present invention to provide an optical recording medium which is capable of seeking or detecting a desired track without reading every track number, permitting curtailment of the seeking time and enabling the check of the track number, thus, ensuring accurate access. Thus, the present invention provides an optical recording medium which is especially suited for random access.

The present invention features an optical recording medium having a plurality of tracks juxtaposed each other, which comprises: a data recording region in which the tracks are juxtaposed each other; and a track detecting region provided at a part of said data recording region; said track detecting region including track guides juxtaposed along the respective tracks and track number guiding means formed so as to correspond to a locus of the movement of an optical head in the seeking of a desired track, said track number guide means intersecting said track guides.

The track number guiding means may preferably intersect the track guides aslant.

The track number guiding means may preferably comprise track number guides which slantingly extends from a lower side of the data recording region to an upper side thereof, from a leading side of the track towards a trailing side thereof and track number guides which declines downwardly from the trailing side of the track towards the starting side thereof. Further, track number detecting mark means may preferably be provided in the vicinity of the respective intersections of the track guides and the track number guiding means. In this case, the detection of the number of tracks can be facilitated. In this connection, it is to be noted that the wordings "lower", "upper", "left", "right", "vertical" and "lateral" used in the specification and/or claims are as viewed in the attached drawings.

Further, track numbers may preferably be written along the respective track guides between the intersections of the track guides and the track number guides. In this case, the detected number of the tracks can be immediately collated with the written track number.

OPERATION

According to the present invention, an optical recording medium having a plurality of tracks juxtaposed each other comprises a data recording region in which the tracks are juxtaposed each other and a track detecting region provided at a part of said data recording region. The track detecting region includes track guides juxtaposed along the respective tracks and track number guiding means corresponding to a locus of the movement of an optical head in the seeking of a desired track. The track number guiding means intersects said track guides. Therefore, the optical recording head can be moved in the direction of the track width, while allowing the optical recording medium to travel at a predetermined speed in the direction of the track. As a result of this, the optical head can trail these guides to move over the tracks.

In the meantime, the optical head detects the track guides which the head has passed over or the track number detecting marks provided in the vicinity of the intersections of the track guides and the track number guides to count the number of the detected guides or marks. Thus, the number of the tracks which the optical head has passed over can be detected. As a result of this, the seeking procedure can be much simplified and the seeking time can be much curtailed as compared with the conventional method in which every track number is read and compared with the desired track number.

More particularly, the present invention can detect or seeking a desired track without reading every track number, permitting curtailment of the seeking time very much. Further, the checking of the track number can be effected easily, which ensures an accurate access operation. Moreover, the present invention provides a track detecting method for an optical recording medium, which is capable of shortening the access time and is suitable for random access.

BRIEF DESCRIPTION OF THE INVENTION

DESCRIPTION OF PREFERRED EMBODIMENT

A preferred embodiment of the present invention will now be described, while referring to the drawings. In the embodiment, the present invention is applied to a card-type optical recording medium.

Configuration of the Embodiment

Figure 1A:
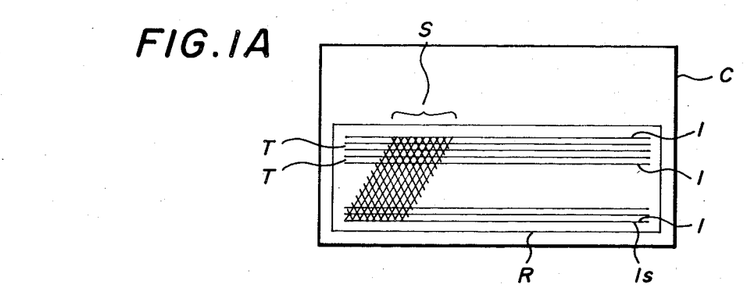
FIG. 1A is a schematic plan view of one form of optical recording medium according to the present invention.

A card-type optical recording medium C embodying the present invention as illustrated in FIG. 1A has a data recording region R which includes a plurality of tracks T arranged juxtaposedly, extending longitudinally in parallel with each other and a track detecting region S provided at a part (at the left in FIG. 1A) of the data recording region R.

Figure 1B:
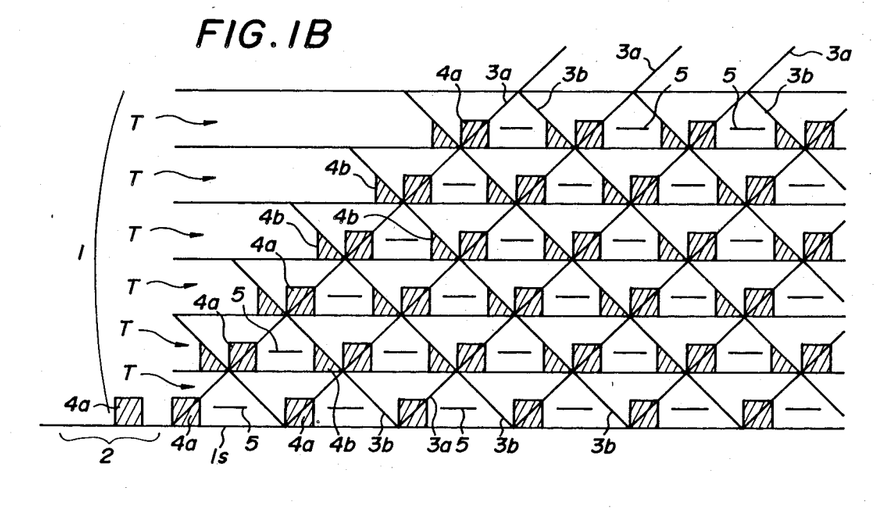
FIG. 1B is an explanatory view of a part of the optical recording medium, schematically showing a track seeking or detecting method for the optical recording medium.

In the track detecting region S, a plurality of track guides 1 are juxtaposed so that the tracks T may be disposed between each adjacent two guides 1, respectively as illustrated in FIG. 1B. The lower end track guide which is denoted by 1s has an extension projecting more than the other track guides 1 for providing a lead-in 2 which is used to set an initial position of an optical head.

Figure 2:
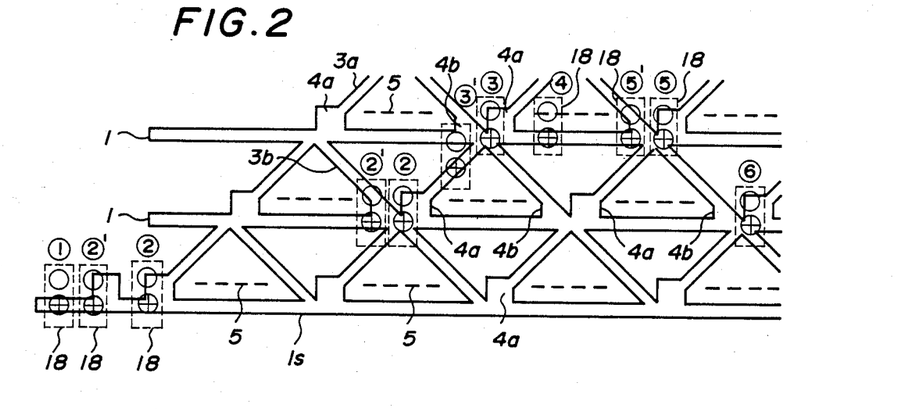
FIG. 2 is an enlarged explanatory view of a part of the optical recording medium shown in FIG. 1B.

These track guides 1 extend in lines along the length of the data recording region R as illustrated in FIG. 1A. In the present embodiment, each of the track guides is a continuous line, but it may alternatively be a discontinuous, e.g. broken, line. The track guide 1 has a width and it is so formed that it can be distinctly distinguished optically (in reflectivity) from the remaining portions of the track detecting region S. For example, the track guides 1 are formed to have a high reflectivity. The track detecting region S further has track number guides 3a, 3b which intersect the track guides 1 aslant. These track number guides 3a, 3b are formed in a similar manner to that of the track guides 1 as shown in FIG. 2. In the present embodiment, the track number guides 3a, 3b are formed simultaneously with the track guides 1. These track number guides 3a, 3b are formed in continuous, solid lines in the embodiment as illustrated, but they may be discontinuous like broken lines.

Angles of the track number guides 3a, 3b with respect to the track guide 1 are determined by a relative moving speed of the recording medium, card, in a direction of the tracks and a relative moving speed of the optical head in a direction of the widths of the tracks. If the former is assumed as V1 and the latter as V2, the angles are determined by the following formula $$\tan \theta = V2/V1$$

In the present embodiment, the angles $\theta$ are 45°. Therefore, the track number guides 3a and 3b intersect at a right angle with each other.

Track number detecting marks 4a, 4b are formed in the vicinity of the intersections of the track guide 1 and the track number guides 3a, 3b. These marks 4a, 4b are formed along the respective track guides 1 and disposed so as to project upwardly than the respective track guides 1 as diagrammatically shown in Fig.1B. These marks are formed in a manner similar to that of the track guides 1 as shown in FIG. 2. In the present embodiment, the marks 4a, 4b are formed similarly and simultaneously with the formation of the track guides 1 and the track number guides 3a, 3b.

Each of the track number detecting marks 4a is formed on the track guide 1 in the shape of a rectangle (square in the embodiment as illustrated) so that the track number guide 3a may pass along a diagonal thereof. On the other hand, each of the track number detecting marks 4b is formed between the track guide 1 and the track number guide 3b in the shape of a triangle.

Between each adjacent two track guides 1, track numbers 5 for indicating the number of the relevant track are preliminarily written between the track number detecting marks 4a and 4b.

OPERATION OF THE EMBODIMENT

The operation of the present embodiment as configured above will now be described.

Prior to the explanation of the operation, a track detecting system employable for detecting tracks according to the present embodiment will be first described. The track detecting system comprises an optical system 10 as illustrated in FIG. 3 and a track detection control system 20.

Figures 3, 4:
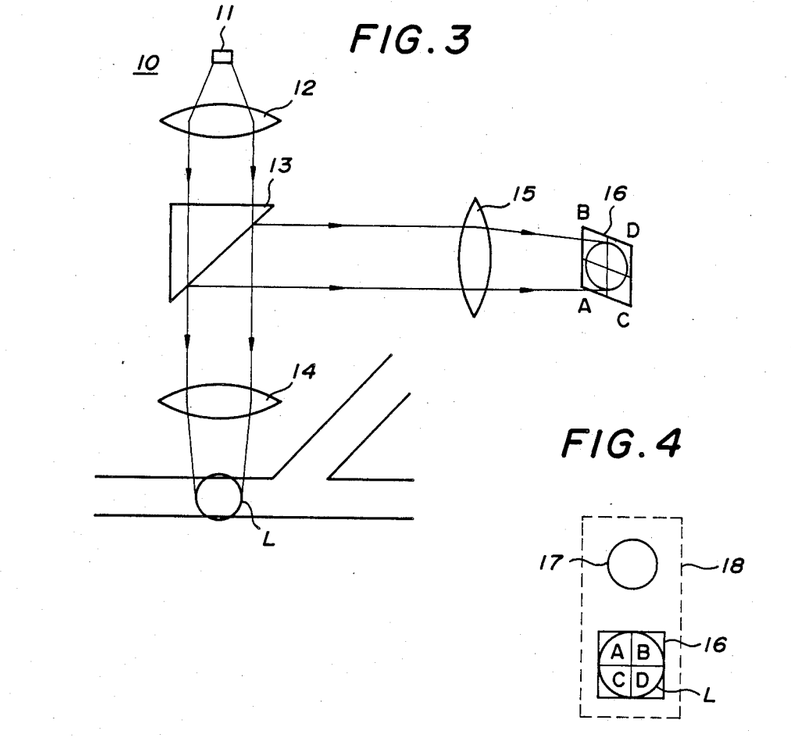
FIG. 3 is an explanatory view of an optical system employable for reading.
FIG. 4 is a plan view of one form of track detector and data detector combined with each other.

The optical system 10 as illustrated in FIG. 3 is basically composed of a light source 11 comprising, for example, a semiconductor laser, a collimater lens 12, a beam splitter 13, an objective lens 14, an exit lens 15, and a track detector 16. This optical system 10 is connected to a drive means (not shown) and adapted to move both in the direction of the track and in the direction of the width of the track. Alternatively, the optical recording medium, card, may be moved in the track direction, instead of driving the optical system, while the optical system being driven in the track width direction. Or, the optical system is adapted to move in the track direction, while the card being driven in the direction of the track. This optical system 10 is adapted to be driven, while being associated with another optical system (not shown) for reading data. In addition, the objective lens 14 is so arranged that its optical axis may be move by an objective lens driving means (denoted by 19 in FIG. 5). Thus, the optical tracking for the card-type optical recording medium may be adjusted finely.

The track detector 16 comprises a semiconductor photodetector such as a photodiode, whose effective light receiving face is divided into four discrete elements A to D. As can be seen from FIG. 4, this track detector 16 is formed, in a monolithic structure, with a data detector comprising a semiconductive photodetector 17 such as a photodiode to form an optical head 18.

This optical head 18 is so disposed that it may view, on the light receiving face of the detector, an image of a light spot L which is formed by the objective lens 14. The optical head 18 can therefore be considered to be at a position of the light spot L, it is explained in the following description that the optical head is hypothetically located on the light spot L.

Figure 5:
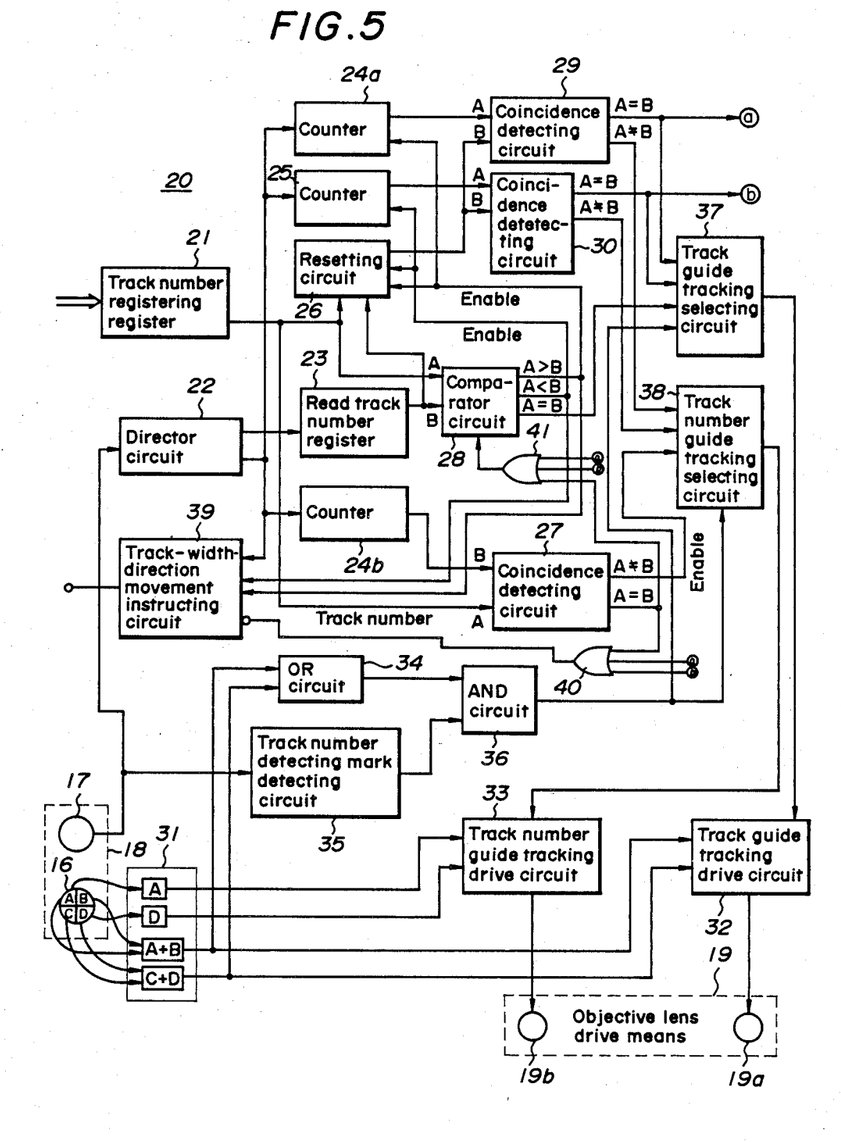
FIG. 5 is a block diagram of one form of track seeking or detection control system employable in the present invention.

The track detection control unit 20 comprises a track number registering register 21 for registering a number of the track to be read; a director circuit 22 for sorting the information input from the data detector 17 into a track number and a track number detecting mark; a read track number register 23 for holding a read track number which is input through the director circuit 22; counters 24a and 24b for counting up every other track number detecting mark; a counter 25 for counting down the track number detecting marks; and a resetting circuit 26 for resetting a target value to be counted, while being based on a difference between the track number registered in the track number registering register 21 and the read track number stored in the read track number register 23.

The track detection control unit 20 further comprises a coincidence detecting circuit 27 which compares the track number registered in the track number registering register 21 and the counted value of the counter 24b to output a coincidence or disagreement signal; a comparator circuit 28 which compares the track number registered in the track number registering register 21 and the read track number stored in the read track number register 23 to output an enable signal corresponding to the result of the comparison; a coincidence detecting circuit 29 which compares the reset value set in the resetting circuit 26 and the counted value of the counter 24a to output a coincidence or disagreement signal; and a coincidence detecting circuit 30 which compares the reset value set in the resetting circuit 26 and the counted value of the counter 25 to output a coincidence or disagreement signal.

The track detection control unit 20 further comprises an interface 31 for converting photo-outputs from the respective elements A to D of the track detector 16 into digital forms and outputting A, D, A+B and C+D; a track guide tracking drive circuit 32 for generating a signal for tracking the track guides based on the outputs A+B and C+D from the track detector 16 to output the same to a drive coil 19a of the objective lens drive means 19; a track number guide tracking drive circuit 33 for generating a signal for tracking the track number guides on the basis of the outputs from the elements A and D of the track detector 16 to output the same to a drive coil 19b of the objective lens drive means 19; an OR circuit for obtaining a logical sum of the outputs A+B and C+D; a track number detecting mark detecting circuit 35 which outputs a detection signal when it detects two successive track number detecting mark signals output from the data detector 17; and circuit 36 which obtains an AND of the detection signal from the detecting circuit 35 and the output from the OR circuit 34 to generate an enable signal; a track guide tracking selecting circuit 37 for selecting the track guide tracking drive circuit 32 to drive the same in response to the coincidence signals from the coincidence detecting circuits 27, 29 and 30 and the enable signals; a track number guide tracking selecting circuit 38 for selecting the track number guide tracking drive circuit 33 in response to the disagreement signals from the coincidence detecting circuits 27, 29 and 30; a track-width-direction movement instructing circuit 39 for outputting a one-track movement instruction signal to a step motor (not shown) which moves the optical system in the direction of the track width by one track.

The counters 24a, 24b and the track-width-direction movement instructing circuit 39 each have a function as a frequency divider. More specifically, the counters 24a, 24b are adapted to count one whenever they receive two detection signals and the track-width-direction movement instructing circuit 39 is adapted to output an instruction signal for moving the optical system by one track width whenever it receives two detection signals. As a result of this, the optical head 18 does not operate, for example, at a position ② but operates at a position ② as shown in FIG. 2.

The counter 24b is always ready to count but the counter 24a gets ready to count when the enable signal from the comparator circuit 28 is input thereto. The track-width-direction movement instructing circuit 39 stops its operation when a coincidence signal is output from any of the coincidence detecting circuits 27, 29 and 30 through an OR gate 40.

Figure 6:
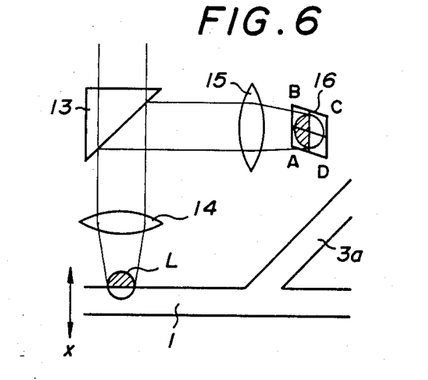
FIG. 6 shows a vertical tracking deviation of the tracking light spot to one side of a track guide.
Figure 7:
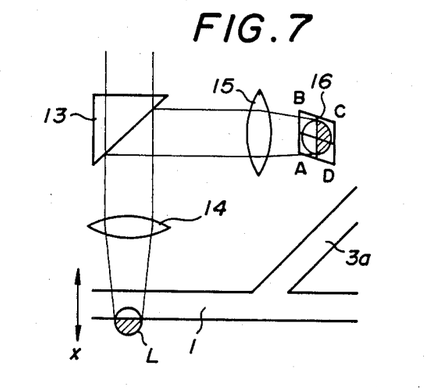
FIG. 7 shows a vertical tracking deviation of the tracking light spot to an opposite side of the tracking guide.

The track guide tracking drive circuit 32 is actuated upon selection by the track guide tracking selecting circuit 37 and it compares the outputs A+B and C+D to detect a vertical deviation of the light spot L from the track guide 1 and output a correcting signal. More specifically, when the light spot L is vertically (as viewed in FIGS. 6 and 7) deviated from the track guide 1, the track guide tracking drive circuit 32 electrically detects unevenness in the photo-output distribution caused between the respective elements of the track detector 16, by comparing the output A+B with the output C+D as shown in FIGS. 6 and 7. The circuit 32 then outputs a correcting signal corresponding to the deviation to the drive coil 19a of the objective lens drive unit 19. The drive coil 19a moves the optical axis of the objective lens 14 in a direction of X shown in FIGS. 6 and 7 to correct the deviation of the light spot L from the track guide 1.

Figure 8:
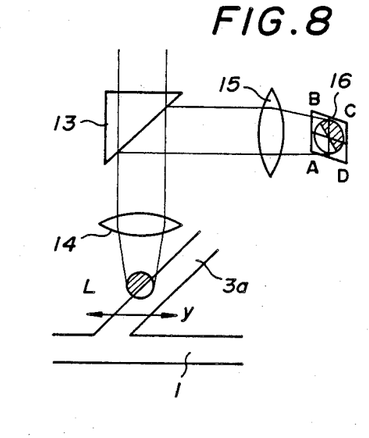
FIG. 8 shows a lateral tracking deviation of the tracking light spot to one side of the track guide.
Figure 9:
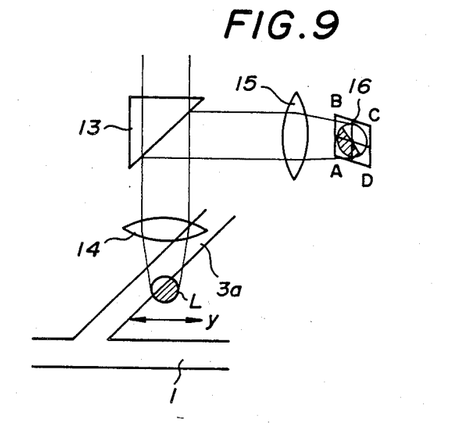
FIG. 9 shows a lateral tracking deviation of the tracking light spot to an opposite side of the track guide.
Figure 10:
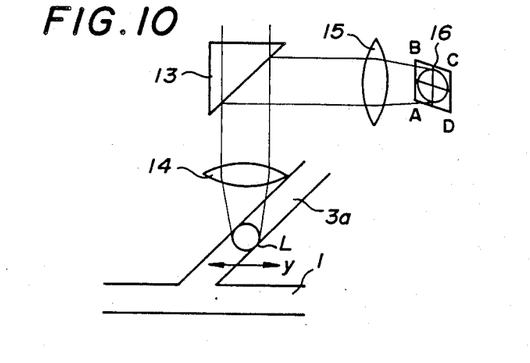
FIG. 10 shows zero vertical and lateral tracking deviation of the tracking light spot along the track guide.

The track number guide tracking drive circuit 33 is actuated upon selection by the track number guide tracking selecting circuit 38 and it compares the output A with the output D to detect vertical deviations of the light spot L from the track number guides 3a, 3b and output a correcting signal. More specifically, when the light spot L is laterally (as viewed in FIGS. 8 and 9) deviated for example from the track number guide 3a, the track number guide tracking drive circuit 33 detects electrically unevenness caused in the photo-output distribution among the respective elements of the track detector 16, by comparing the output A with the output D as shown in FIGS. 8 and 9. The circuit 33 then outputs a correcting signal corresponding to the deviation to the drive coil 19b of the objective lens drive unit 19. The drive coil 19b moves the optical axis of the objective lens 14 in a direction of Y as shown in FIGS. 8 and 9 to correct the deviation of the light spot L from the track number guide 3a for putting the light spot L into a position of FIG. 10.

The operation for setting the track number to be read in the track number registering register 21 to read the data in the relevant track will now be described.

First, the optical head 18 is positioned at the left end of the card and then moved in the direction of the width of the track to detect the lead-in 2. After detection of the lead-in 2, the card is moved from the right to the left in FIG. 1B. The optical head 18 thus moves relatively in the direction of the track.

In the optical head 18, the light beam from the light source 11 is caused to become parallel by the collimater lens 12 and forms a light spot L through the beam splitter 13 and the objective lens 14. The reflected light from the light spot L is incident upon the beam splitter 13 through the objective lens 14 and branched there to be projected onto the track detector 16 through the exit lens 15.

The track detector 16 converts the luminance distribution of the image of the light spot L into electrical signals proportional to the incident light amounts by the discrete elements A to D of the track detector 16. The outputs from the respective elements of the track detector 16 are output as A, D, A+B and C+D through the interface circuit 31.

When the track number detecting mark 4b is detected by the data detector 17, the detection signal is transmitted to the counters 24a, 24b and the track-width-direction movement instructing circuit 39 through the director circuit 22.

Since the optical head 18 continues the relative movement, the data detector 17 will then detect another track number detecting mark 4a. This detection signal is also transmitted to the counters 24a, 24b and the track-width-direction movement instructing circuit 39 through the director circuit 22.

The counter 24b counts one upon receipt of two detection signals. The count value is given to the coincidence detecting circuit 27. The coincidence circuit 27 compares the count value of the counter 24b with the registered value of the track number registering register 21. When the values coincide with each other, the circuit 27 transmits a coincidence signal to the comparator circuit 28 and the track-width-direction circuit 39. When the values do not coincide, it transmits a disagreement signal to the track number guide tracking selecting circuit 38.

The track-width-direction movement instructing circuit 39 outputs a track-width-direction movement instruction signal upon receipt of two detection signals, subjecting to the conditions that no coincidence signals are output from the coincidence circuit 27. In other words, the conditions under which the coincidence signal is output show that the optical head 18 has already reached the desired track, while the disagreement signal shows that the optical head 18 has not yet reached the desired track.

When the track-width-direction movement instruction signal is output, the optical head 18 is fed by one track width in the direction thereof by the not shown step motor. In the meantime, since the card-type optical recording medium moves in the direction of the track, the optical head 18 moves along the track number guide 3a.

At this time, if the light spot L is deviated from the track number guide 3a, the objective lens 14 may be adjusted to assure accurate tracking. More specifically, since the track number tracking drive circuit 33 is selected by the track number tracking selecting circuit 38, the correcting signal is output based on the deviation signal from the track detector 16 to operate the drive coil 19b of the objective lens drive means 19 for moving the optical axis of the objective lens 14 and correcting the deviation as described above.

Since the data detector 17 is provided at an upper position (in the figures) than the track detector 16, it detects the track number detecting mark 4b provided on the next track guide before the optical head 18 has completed its movement by one track. The detection signal is transmitted to the counters 24a, 24b and the track-width-direction movement instructing circuit 39 through the director 22 as described above.

When the optical head 18 thus continues the movement in the direction of the track, the number of the track guides by which the optical head 18 has passed so far is cumulatively set in the counter 24b.

If the count value of the counter 24 coincides with the track number set in the track number registering register 21 when the optical head 18 is on a certain track, the coincidence detecting circuit 27 outputs a coincidence signal as described above.

When the coincidence signal is output from the coincidence detecting circuit 27, the track-width-direction movement instructing circuit 39 stops the operation. As a result of this, the optical head 18 stops its movement in the direction of the width of the track, while continuing the movement in the direction of the track alone.

Therefore, data indicative of the track number 5 are sequentially input to the data detector 17, according to the movement of the optical head 18 along the length of the track. The track number 5 read by the data detector 17 is stored in the track number register 23 through the director circuit 22.

The coincidence signal as referred to above further actuates the comparator circuit 28 to compare the track number stored in the track number register 23 and the track number stored in the track number registering register 21.

When the track numbers coincide with each other, the comparator circuit 28 confirms that the optical head 18 is located on the desired track and supplies the coincidence signal to the track guide tracking selecting circuit 37.

Thus, the track guide tracking drive circuit 32 is selected and the objective lens 14 is adjusted so that the optical spot L of the optical system may not be deviated from the track guide 1. The optical head 18 then travels in the direction of the track along the track guide 1 to a position of the desired track, in which data has been written, and starts to read the data.

On the other hand, when the registered track number (A) is not coincident with the read track number (B), an enable signal is transmitted to the resetting circuit 26, the track-width-direction movement instructing circuit 39 and the counter 24a or the counter 25 according to the sign of the difference between the numbers. More specifically, if A>B, the enable signal is supplied to the counter 24a and if A<B, it is supplied to the counter 25.

A<B indicates that the optical head 18 has not reached the desired track yet and A>B indicates that the optical head 18 has already passed over the desired track. Therefore, in the former case, the optical head 18 must be further moved in the same direction as before, but in the latter case, the optical head 18 must be moved towards the reference track guide 1s.

The resetting circuit 26 is actuated by the enable signal to obtain a difference between the registered track number (A) and the read track number (B) and re-set the difference as a desired, target track number.

On the other hand, the track-width-direction movement instructing circuit 39 releases the stopped conditions. If A>B, it outputs a track-width-direction movement instruction signal upon every two detection signals as described above. If A<B, a track-width-direction signal is output upon every one detection signal. In the latter case, however, the signal is attached with a minus sign and the movement direction of the optical head 18 is reversed.

When the optical head 18 again starts its movement in the direction of the width of the track, the track number detecting marks 4b, 4a are detected if the movement is in the upward direction (as viewed in FIGS. 1 and 2) as described above. In the case the movement is in the downward direction (as viewed in FIGS. 1 and 2), the track number detecting mark 4b positioned under the track number guide 3b can not be detected by the data detector 17 and therefore only the track number detecting mark 4a is detected. The detection signal from the data detector 17 is supplied to the counters 24a, 25 through the director circuit 22. As to the counters 24a, 25, either one of the counters 24a, 25 which has been input with the enable signal is operated. The counting results are supplied to the respectively corresponding coincidence detecting circuits 29, 30 and compared with the value set in the resetting circuit 26.

When the count result is coincident with the set value in the resetting circuit 26, the coincident signal is transmitted to the track-width-direction movement instructing circuit 39 through the OR gate 40 to stop the operation of the same. The coincidence signal is further transmitted to the track guide tracking selecting circuit 37 to select the track guide tracking drive circuit as described above.

The coincidence signal is further transmitted to the comparator circuit 28 through the OR gate 41 to let the comparator circuit 28 compare the track number stored in the track number register 23 with the track number stored in the track number registering register 21 once more.

Then, if these track numbers coincide with each other, it is judged that the optical head 18 is located on the desired track and a coincidence signal is transmitted from the comparator 28 to the track guide tracking selecting circuit 37.

Thus, the track guide tracking drive circuit 32 is selected and the objective lens 14 is adjusted so that the optical spot L of the optical system may not be deviated from the track guide 1. Then, the optical head 18 relatively moves in the direction of the track along the track guide 1 to a position of the track, in which data has been written, and reads the data.

On the other hand, if the track numbers are not coincident with each other, the optical head 18 is further moved in the same track width direction as before and such operations as described above are repeated until a coincidence signal is output as described above.

According to the present embodiment, the track number can be detected easily and quickly by detecting the track number detecting marks 4a, 4a by the optical head and the detection value can be checked through the comparison with the written track number. In addition, if an error is detected, a correcting value can be reset, allowing the track detection to proceed without suspending or beginning all over again. Thus, the time for accessing the desired track can be curtailed very much.

MODIFICATION OF THE EMBODIMENT

The foregoing embodiment is shown only for an exemplary purpose and the embodiment may have various modifications within the scope of the present invention. For example, the track number detecting marks may be formed differently from the shapes of the embodiment. Or, the inclinations of the track number guides may be other angles than 45°. For example, the inclinations of the track number guides may be steep, for example, 60°. When the inclinations are selected to be steep, the width of the track detection region S may be narrowed.

In the extreme case, the inclinations of the track number guides can be 90°. In this case, however, the movement of the optical head might possibly be discontinuous.

Although the track number detecting marks are provided in the optical recording medium according to the embodiment, they may be omitted. In this case, the detection of the number of the tracks is carried out by detecting and counting the number of the track guides and/or the track number guides which the data detector has passed over during the movement of the optical head along the track number guide.

I claim:

1. An optical recording medium for use with an optical data reader used for reading data from said recording medium in a data scanning direction, said optical recording medium comprising:
    a data recording region including a plurality of data tracks extending in said data scanning direction juxtaposed each other; and
    a track detecting region provided at a portion of said data recording region, including
        track guides juxtaposed along respective ones of said data tracks,
        track number guiding means intersecting said track guides aslant, said track number guiding means corresponding to a locus of movement of an optical head of said optical data reader to access a desired track,
        a first track number detecting mark positioned in the vicinity of each of the intersections of the track guides and the track number guides which extend from a leading side of the track toward a trailing side thereof, and
        a second track number detecting mark positioned in the vicinity of each of the intersections of the track umber guides declining from the trailing side of the track towards the leading side thereof, said track towards the leading side thereof, said first track number guides and said second track number guides differing in shapes.

2. An optical recording medium as claimed in claim 1, wherein said track number guiding means comprise number guides which slantingly extend from a lower side of the data recording region to an upper side thereof, from said leading side of a respective track towards a trailing side thereof and track number guides which declines downwardly from the trailing side of the track towards the starting side thereof.

3. An optical recording medium as claimed in claim 1, in which track numbers are written along the respective track guides between the intersections of the track guides and the track number guides.

4. An optical recording medium for use with an optical data reader used for reading data from said recording medium in a data scanning direction, said optical recording medium comprising:
    a data recording region including a plurality of data tracks extending in said data scanning direction juxtaposed each other; and
    a track detecting region provided at a portion of said data recording region including track guides juxtaposed along respective ones of said data tracks, said track number guiding means intersecting said track guides aslant, said track number guiding means corresponding to a focus of movement of an optical head of said optical data reader to access a desired track, and track numbers positioned adjacent to respective ones of said track guides between the intersections of the track guides and the track number guides.

5. An optical recording medium for use with an optical data reader used for reading data from said recording medium in a data scanning direction, said optical recording medium comprising:

a data recording region including a plurality of parallel data tracks extending in said data scanning direction; and a track detecting region provided at a portion of said data recording region, including track guides juxtaposed along respective ones of said data tracks, track number guiding means intersecting a plurality of said track guides aslant, and track number detecting marks positioned in the vicinity of each of the intersections of the track guides and the track number guides, said track number detecting marks having different shapes corresponding to placement thereof with respect to said intersection.

6. An optical recording medium for use with an optical data reader used for reading data from said recording medium in a data scanning direction, said optical recording medium comprising:

a data recording region including a plurality of parallel data tracks extending in said data scanning direction; and a track detecting region provided at a portion of said data recording region including track guides juxtaposed along respective ones of said data tracks, said track number guiding means intersecting said track guides aslant, and track numbers detectable by said optical data reader and positioned adjacent to respective ones of said track guides between the intersections of the track guides and the track number guides.

7. An optical recording medium for use with an optical data reader used for reading data from said recording medium in a data scanning direction, said optical recording medium comprising:

a data recording region including a plurality of data tracks extending in said data scanning direction juxtaposed each other; and a track detecting region provided at a portion of said data recording region, including track guides juxtaposed along respective ones of said data tracks, track number guiding means intersecting a plurality of said track guides aslant, said track number guiding means corresponding to a locus of movement of an optical head of said optical data reader to access a desired track.

8. An optical recording medium as claimed in claim 7, wherein said track number guiding means comprises number guides which slantingly extend from a lower side of the data recording region to an upper side thereof, from said leading side of a respective track towards a trailing side thereof and track number guides which declines downwardly from the trailing side of the track towards the starting side thereof.

* * * * *